United States Patent
Bachelder et al.

[11] Patent Number: 5,257,815
[45] Date of Patent: Nov. 2, 1993

[54] INFLATOR MOUNTING SYSTEM

[75] Inventors: Theodore J. Bachelder, Romeo; Thomas J. Klena, II, Troy; Steven W. Maurer, Fraser; Ronald R. Modlin, Romeo; James T. Puckett, Mt. Clemens; John E. Stepnick, Romeo; Jeffrey C. Synor, Utica; John P. Wallner, Rochester Hills, all of Mich.

[73] Assignee: TRW Vehicle Safety Systems Inc., Lyndhurst, Ohio

[21] Appl. No.: 779,884

[22] Filed: Oct. 21, 1991

[51] Int. Cl.⁵ ............................................. B60R 21/16
[52] U.S. Cl. ........................................ 280/728; 403/4
[58] Field of Search ............... 280/728, 732, 736, 740, 280/741, 742; 102/530, 531; 422/164, 165, 166; 222/3; 403/3, 4

[56] References Cited

U.S. PATENT DOCUMENTS

| | | |
|---|---|---|
| 3,791,671 | 2/1974 | Zens . |
| 3,794,346 | 2/1974 | Brockman et al. ............... 280/740 |
| 3,794,347 | 2/1974 | Zens . |
| 3,887,109 | 6/1975 | Libkie ............................. 222/3 |
| 4,153,273 | 5/1979 | Risko ............................. 280/740 |
| 4,158,696 | 6/1979 | Wilhelm ......................... 422/166 |
| 4,191,392 | 3/1980 | Barnett .......................... 280/740 |
| 4,941,678 | 7/1990 | Lauritzen et al. ............... 280/743 |
| 5,069,480 | 12/1991 | Good ............................. 280/743 |

FOREIGN PATENT DOCUMENTS

1194397 5/1959 France ............................. 403/51

*Primary Examiner*—Karin L. Tyson
*Attorney, Agent, or Firm*—Calfee, Halter & Griswold

[57] ABSTRACT

A vehicle air bag assembly includes an air bag container with a special orientation device for orienting and supporting an inflator in the container. The air bag container includes a pair of spaced-apart sidewalls. One of the pair of sidewalls has an opening which is dimensioned to receive an inflator. The orientation device comprises an orientation ring coupled to the one of the sidewalls and located at least partially within the opening in the one of the sidewalls. The inflator is loaded into the container through an opening in the orientation ring. The orientation ring has an internal configuration which (i) requires the inflator to be in an initial orientation as the inflator is loaded into the container, and (ii) engages a portion of the inflator to center and support the inflator in a predetermined final orientation when the inflator is coupled to the container.

8 Claims, 8 Drawing Sheets

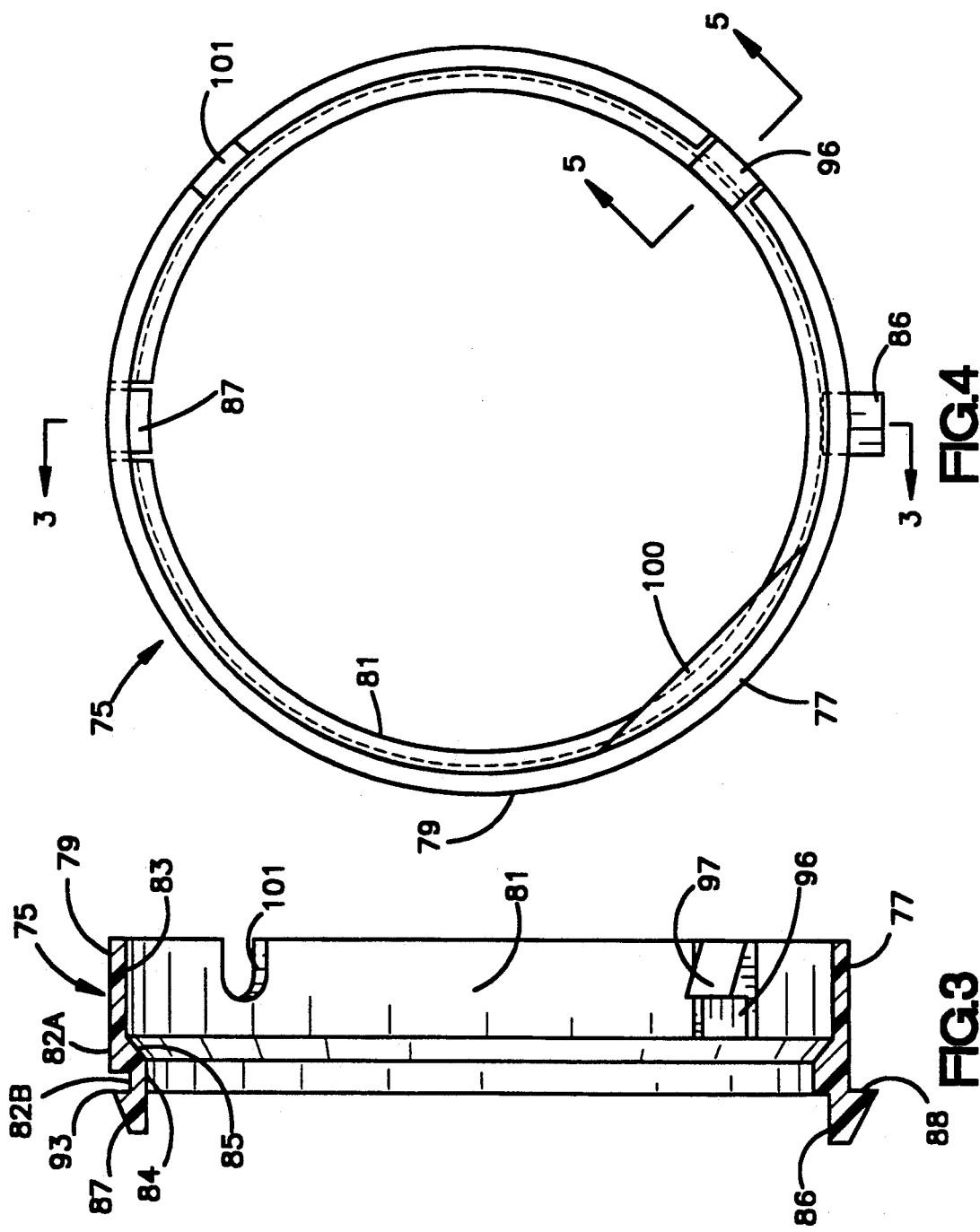

INFLATOR MOUNTING SYSTEM

TECHNICAL FIELD

The present invention relates to a vehicle air bag assembly with a new and useful orientation device for orienting and supporting an air bag inflator in a predetermined orientation within an air bag container.

BACKGROUND OF THE INVENTION

A typical vehicle air bag assembly comprises an inflatable air bag stored in a container, and an inflator coupled to the container and in fluid communication with the air bag. The inflator is actuated at the onset of a collision, and rapidly directs an inert, non-toxic fluid through a fluid discharge port structure. The inflator is coupled to the container in a particular orientation such that the fluid directed through the fluid discharge port structure flows into the air bag and rapidly inflates the air bag to a predetermined configuration within a predetermined time frame. The inflated air bag cushions and retards forward movement of the vehicle occupant who is being pitched forward during the collision.

When an inflator is coupled to an air bag container, it is important that the inflator, and in particular the fluid discharge port structure, is precisely oriented relative to the air bag, so that during a collision the air bag is rapidly inflated to its predetermined configuration in the predetermined time frame. Thus, in an air bag assembly designed for a particular make of vehicle, an inflator will be coupled to an air bag container in an orientation which has been predetermined for that make of vehicle. Moreover, when producing large quantities of air bag assemblies for that make of vehicle, the inflators must all be consistently coupled to their respective containers in the same predetermined orientation, so that all air bag assemblies for that make of vehicle will function in a consistent, predictable manner.

Still further, applicants believe that in some circumstances, it may be useful to form air bag assemblies using the same basic container structure, but reorienting the inflators in the air bag assemblies. Examples of such circumstances include: i) reorienting inflators to account for different locations of air bag assemblies within different makes of vehicles; ii) reorienting inflators on account of different types, sizes or configurations of air bags in the air bag assemblies; iii) reorienting inflators on account of changes in the type, size or configuration of the inflators being incorporated in the air bag assemblies; and iv) combinations of the foregoing.

In addition, applicants believe it is desirable to provide an air bag assembly with a container which has the flexibility to accept inflators of slightly varying lengths or diameters without structurally modifying the container. Still further, applicants believe it is desirable to provide protection for the squib wires and associated wire harness elements on the end of the inflator. Protection for the squib wires and associated wire harness elements can be important in the event the inflator or air bag container is dropped or struck during installation on the vehicle.

Also, applicants believe that in an air bag assembly, it can be useful to provide an intermediate member between an inflator and a structural portion of a container for purposes such as: i) thermal insulation, ii) vibration damping, iii) corrosion protection, and iv) combinations of the foregoing.

In the past it has been common to couple an inflator directly to a structural part of the container, and to design the inflator and the structural part of the container to cooperate to orient the inflator properly in the container. For example, in Risko, U.S. Pat. No. 4,153,273, a cylindrical inflator is side-loaded into a reaction can. A threaded stud at one end of the inflator is received in a hole formed in one sidewall of the reaction can. A nut is drawn down on the threaded stud to couple the one end of the inflator to the reaction can and to trap the mouth of an air bag within the reaction can. The other end of the inflator includes an annular tapered flange which is frictionally trapped in an aperture formed in the opposing sidewall of the reaction can. The flange includes a radially extending key member which is designed to be received in a notch in the wall of the reaction can. During installation of the inflator within the reaction can, the inflator must be rotated until the key member can be inserted in the notch in the wall of the reaction can to align gas flow openings of the inflator properly relative to the air bag.

In the air bag assembly of the type shown in Risko, the orientation of the inflator in the container is initially determined by the location of the key member on the inflator and the location of the notch in the reaction can. In order to reorient the inflator in the reaction can, it would be necessary to modify the inflator housing, the reaction can, or both. Structurally modifying the reaction can or inflator housing can require retooling or modification of the dies and/or molds used in the formation of one (or both) of these components. Moreover, the structure of Risko does not appear to provide specific protection for squib wires and obviously does not have a separate intermediate member between an inflator and a structural portion of a container for any of the purposes set forth above.

SUMMARY OF THE INVENTION

The present invention provides a new and useful structure and method for orienting an inflator in an air bag container. More particularly, the present invention provides a special orientation device which orients and supports an inflator in a predetermined orientation within an air bag container. The orientation device can be simply and efficiently changed, to reorient an inflator within an air bag container, without structurally modifying the air bag container or the inflator housing. Additionally, the orientation device is designed to orient and support inflators of slightly varying lengths and slightly varying diameters without having to structurally modify the container. Further, the orientation device is designed to i) thermally and physically insulate the inflator from the container, and ii) provide protection for the squib wires and associated wire harness elements on the end of the inflator in the event of physical impact.

According to the preferred embodiment of the present invention, the container for the air bag module includes a pair of spaced-apart sidewalls. One of the pair of sidewalls has an opening dimensioned to receive the inflator. The orientation device comprises an orientation ring coupled to one of the sidewalls and located at least partially within the opening in the one of the sidewalls. The inflator is loaded into the container through an opening in the orientation ring. The inflator has a leading end which is inserted through the opening in the orientation ring and which is adapted to be coupled to the opposite one of the sidewalls. The inflator also includes a trailing end with a flange extending circumferentially around the periphery of the inflator.

The internal configuration of the orientation ring and the external configuration of the flange on the inflator are designed to (i) require the inflator to be in an initial configuration when the inflator is loaded into the container, and (ii) engage each other in a manner which centers and supports the inflator in a predetermined final orientation when the leading end of the inflator is coupled to the container. Specifically, the inflator and the orientation ring each has a central axis, and as the leading end of the inflator is being coupled to the other of the sidewalls, the internal configuration of the orientation ring engages the external configuration of the flange on the inflator to (i) bring the central axis of the inflator into alignment with the central axis of the orientation ring to center the inflator in a final orientation in the orientation ring, and (ii) support the inflator in that final orientation.

The orientation ring is preferably formed from polymeric material, and most preferably from inexpensive, heat-resistant, injection-molded thermoplastic material. In order to reorient the same type of inflator within the same type of container, the orientation ring is simply molded with its internal configuration unchanged, but reoriented, so as to change the initial orientation of the inflator required to load the inflator into the container. Applicants believe that reorienting the internal configuration of a polymeric ring is less costly, simpler and more efficient than reconfiguring the shape of the inflator or a container, in order to reorient the inflator within the container. Moreover, forming the orientation ring of polymeric material is believed to provide (i) thermal insulation, (ii) vibration damping, and (iii) corrosion resistance between the inflator and container (which are often made of metallic material).

Additionally, according to the preferred embodiment, the orientation ring includes a notch designed to surround the protect squib wires and associated wire harness elements on the end of the inflator if the air bag container is dropped or struck during installation in an air bag assembly.

According to an additional aspect of the invention, an isolator member can be interposed between the leading end of the inflator and the other sidewall of the container as the leading end of the inflator is coupled to the sidewall. The isolator member comprises a disc-shaped washer preferably formed from heat resistant, polymeric material. The isolator member is designed to isolate the end of the inflator thermally and vibrationally from the other sidewall of the container and to provide corrosion protection for these components.

Further features of the present invention will become apparent from the following detailed description and the accompanying drawings.

BRIEF DESCRIPTION OF THE DRAWINGS

FIG. 3 is a sectional side view of the orientation device for the air bag module taken substantially along the plane described by the lines 3—3 of FIG. 2;

FIG. 4 is a rear view of the orientation device taken substantially along the plane described by lines 4—4 of FIG. 2;

FIG. 5 is a cross-sectional side view of the inflator coupling member on the orientation device taken substantially along the plane described by lines 5—5 of FIG. 4;

DETAILED DESCRIPTION OF THE PREFERRED EMBODIMENT

Figure 1:
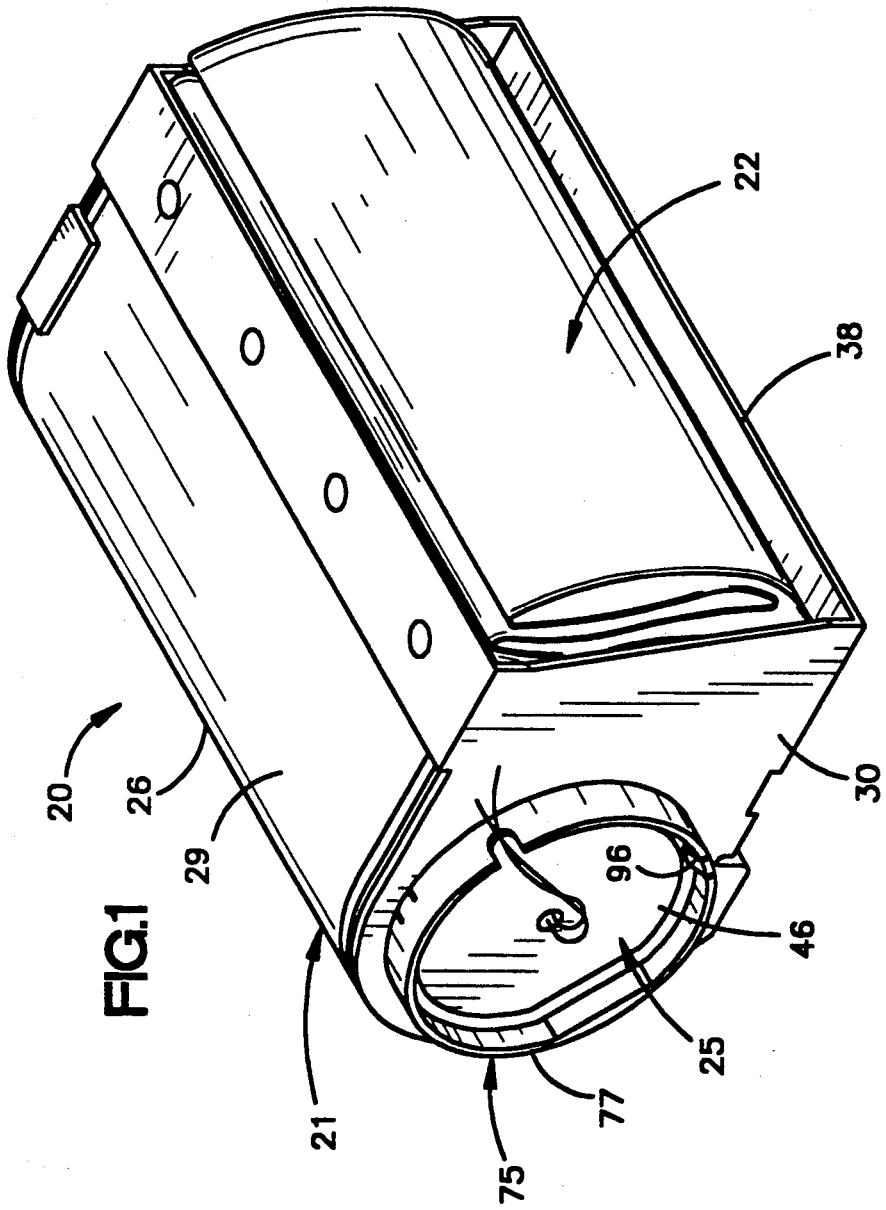
FIG. 1 is a perspective schematic illustration of the external profile of an air bag module constructed according to the present invention.
Figure 2:
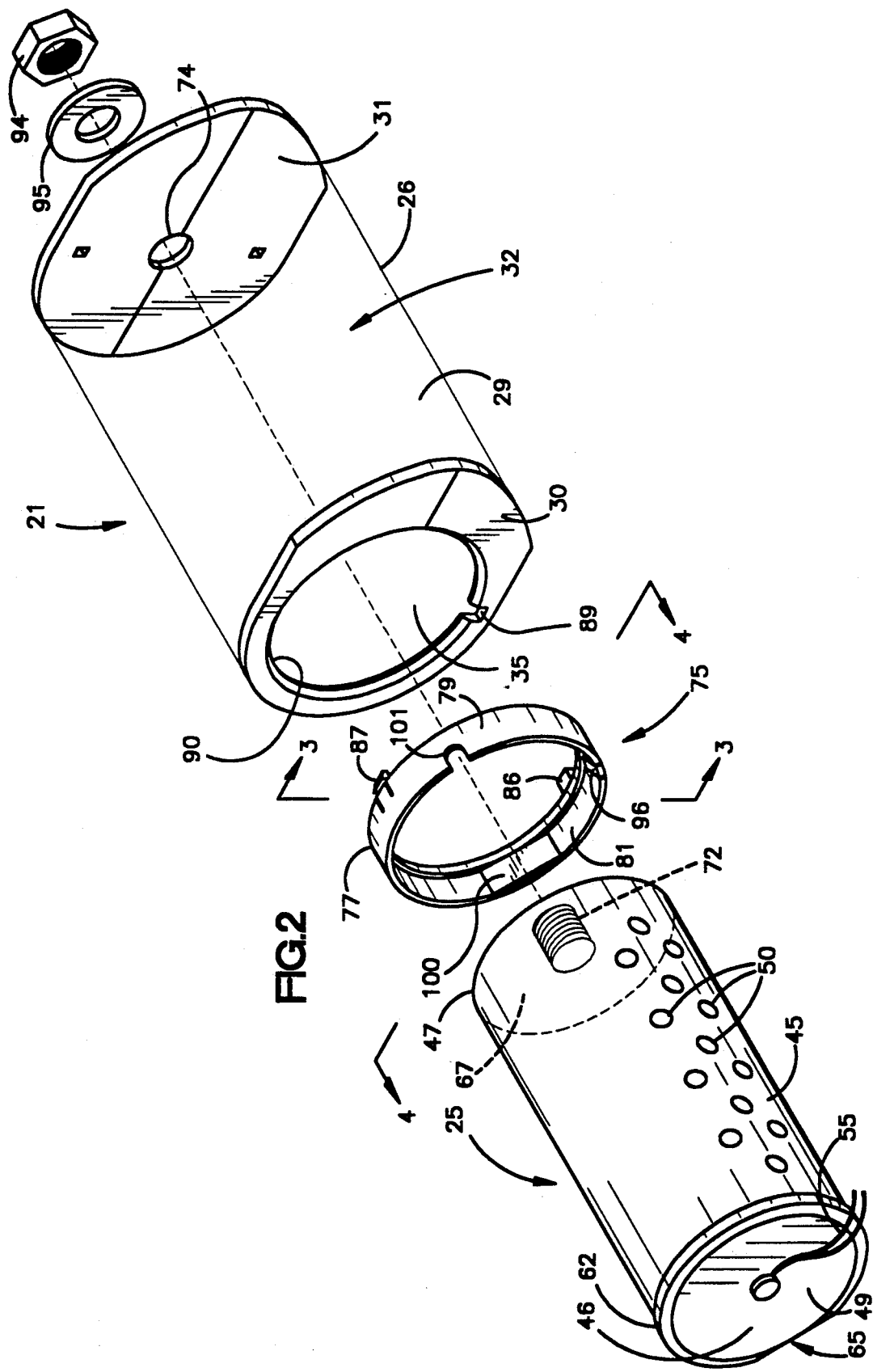
FIG. 2 is a schematic exploded illustration of certain components of the air bag module of FIG. 1, with the air bag omitted.
Figure 6:
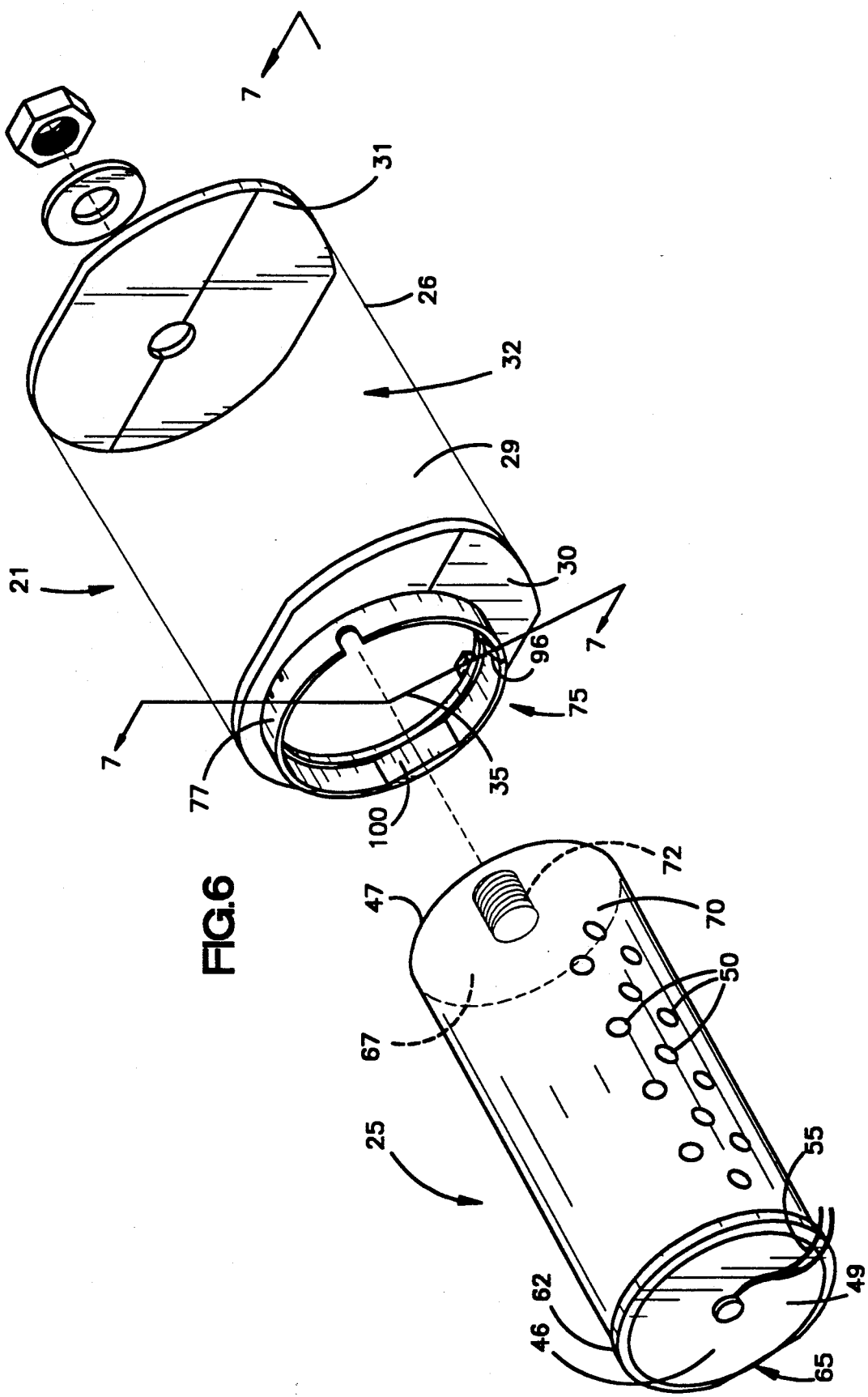
FIG. 6 is a schematic view of the partially assembled reaction can of FIG. 2, illustrating the orientation device coupled within the opening in the sidewall of the reaction can.
Figure 7:
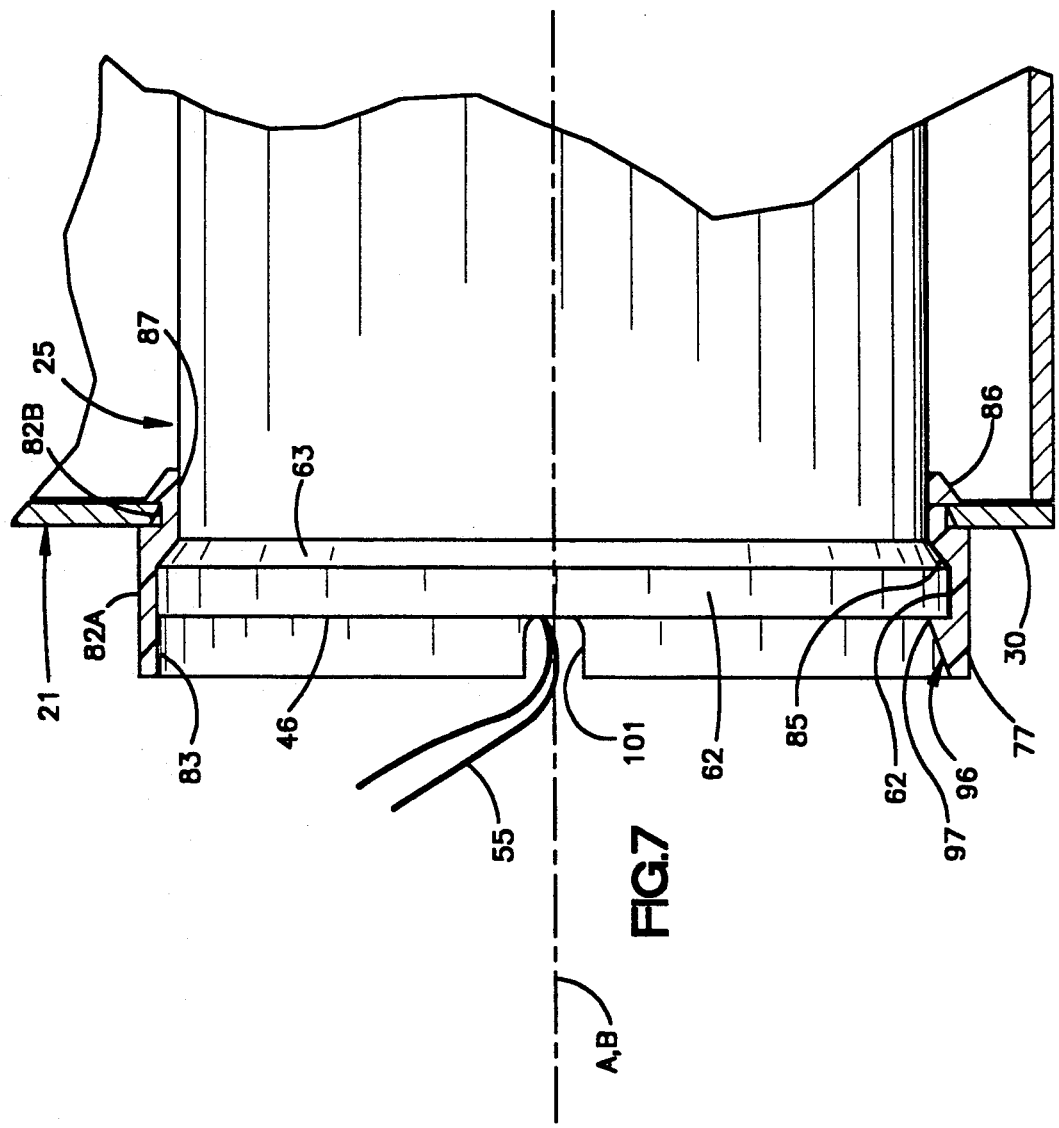
FIG. 7 is an enlarged, partial schematic illustration of the reaction can taken substantially along the plane described by the lines 7—7 in FIG. 6, showing the inflator located within the reaction device and the flange of the inflator seated within the orientation device.
Figure 8:
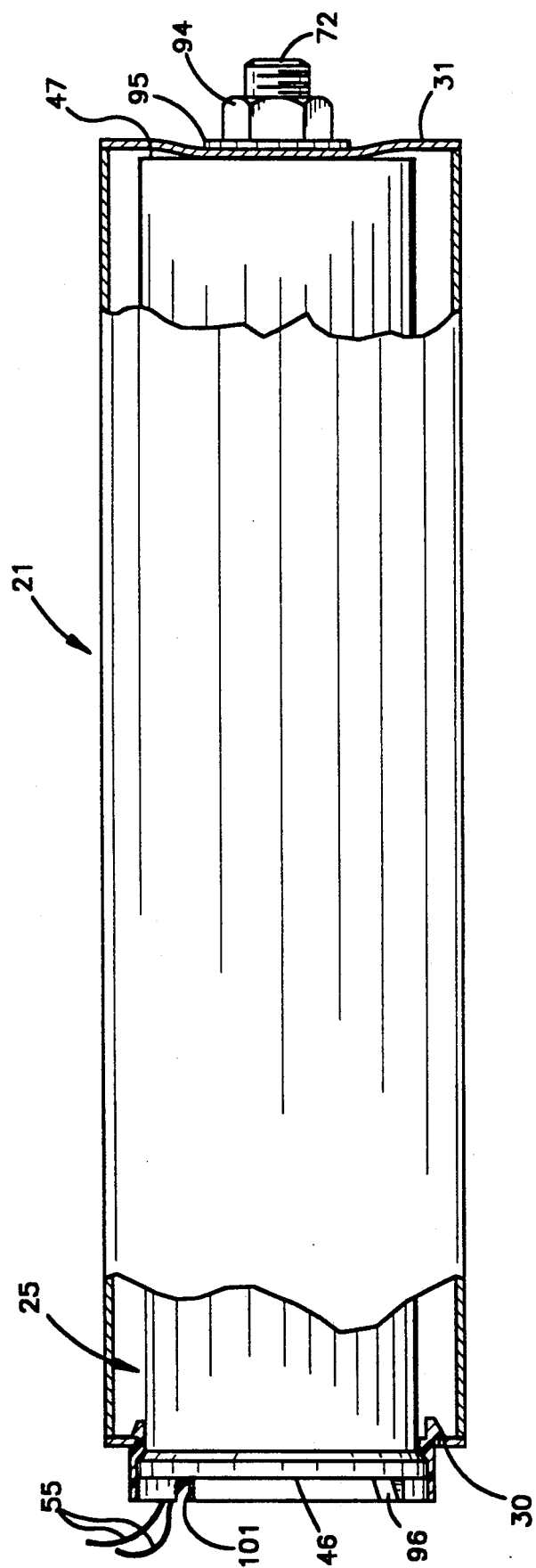
FIG. 8 is a cross-sectional side view of the fully assembled reaction can showing the compression condition between the inflator and the sidewall of the reaction can.

Referring to the drawings, and initially to FIGS. 1 and 2, an air bag assembly according to the present invention is illustrated generally at 20. The air bag assembly 20 includes a container, indicated generally at 21, which at least partially encloses a folded air bag, indicated generally at 22, and an inflator, indicated generally at 25. The air bag assembly 20 is designed to inflate the air bag 22 into the passenger compartment of a vehicle.

Preferably the container 21 comprises a reaction can, reaction plate or other reaction device which at least partially encloses the air bag assembly and inflator. The container 21 includes a housing 26 which is preferably drawn (e.g., deep drawn) or stamped from aluminum or steel. The housing 26 includes a main wall 29 and a pair of opposed, spaced-apart sidewalls 30, 31. The sidewall 30 in housing 26 includes a generally circular opening 35 (FIG. 2) which is designed to enable insertion of the inflator 25 into the container cavity 32. The housing also includes a front opening 38 for enabling at least a part of the air bag 22 to be deployed from the container. Thus, the container 21 encloses the inflator 25 and at least part of the air bag 22, and stores those components until an emergency situation arises. An exemplary container for the present invention is shown in Ziomek, et al, U.S. Pat. No. 4,842,300, which is assigned to the assignee of the present invention.

Referring now to FIG. 2, the inflator 25 for the air bag module preferably includes an impact-extruded cylindrical outer wall 45 having opposite ends 46, 47. The outer wall 45 includes fluid discharge port structure 50 formed in selected locations along the wall. The length of the cylindrical outer wall 45 of the inflator is substantially greater than the diameter of the wall. A source (not shown) of inert gas (e.g., nitrogen) is located within the inflator 25. The gas source may be a combustible gas generating material, a quantity of gas stored in a container, or a combination of combustible material and stored gas. When required, the gas is discharged from the inflator through the fluid discharge port structure 50. A preferred cylindrical inflator structure which can be used in the present invention is shown in U.S. Pat. No. 4,938,501, which is also assigned to the assignee of the present invention. The present invention is not intended to be limited to a cylindrical inflator structure, however, and it is believed that other inflator structures can also be used. The internal structure of the inflator (e.g., gas generating material, filters, etc.) are known to those skilled in the art and will not be discussed herein.

The end 46 of the inflator 25 has an end closure 49. The closure 49 has squib wires 55 (and associated wire harness elements) which project outwardly from the inflator. The squib wires 55 are typically connected to sensors or switches (not shown) for activation of the inflator. The end 46 of the cylindrical inflator 25 also includes a flange 62 formed integrally with and extending away from the cylindrical outer wall 45. The flange 62 encircles the inflator and has a tapered portion 63 which extends inwardly at an angle of approximately 45°. The flange 62 also includes a flat portion, indicated generally at 65, formed at a selected location around the circumference of the flange.

The other end 47 of the inflator has an end wall 67. A threaded stud 72 is formed integrally with and extends axially outward from the end wall 67. The threaded stud 72 is designed to be received within a hole 74 formed in the opposing sidewall 31 of the container housing 26 and fastened to the sidewall 31, as will be described herein in more detail.

According to the present invention, the end 46 of the cylindrical inflator 25 is supported in the container 21 by an orientation device e.g., an orientation ring, indicated generally at 75 in FIGS. 2-4. The orientation ring 75 is preferably formed from polymeric material, and most preferably injection molded, heat-resistant thermoplastic material (e.g., GE Ultem 2300 or other appropriate polymeric material), and includes a continuous frame 77. The frame 77 has an outer, substantially smooth circumferential surface 79 and a contoured inner circumferential surface 81. More particularly, the outer surface 79 includes an upper surface portion 82A and a lower surface portion 82B having a slightly smaller diameter than the upper surface portion. Additionally, the inner surface 81 has an annular upper collar 83, an annular lower collar 84 which has a slightly smaller diameter than the upper collar, and an annular shoulder 85 between the collars 83 and 84 which tapers inwardly at an angle of about 45°.

The orientation ring 75 further includes a tab 86 and a spring hook 87 which are designed to couple the orientation ring 75 to a portion of the container sidewall 30, namely to a lip 90 which surrounds opening 35. Tab 86 and spring hook 87 are formed in one piece with the frame 77 of the orientation ring and project axially away from the frame. The tab 86 includes a catch 88 which is designed to be located within a notch 89 formed in a selected location in the outer lip 90 of the opening 35. The spring hook 87 is positioned approximately diametrically opposed to tab 86 and includes a catch 93 which is designed to engage the lip 90 surrounding the opening 35.

To assemble the air bag assembly 20, the orientation ring 75 is coupled to the container 21 as shown in FIGS. 2 and 6-8. The tab 86 is initially located in the notch 89 formed in the lip 90. The orientation ring is thereafter pushed inwardly into the opening 35 until the spring hook 87 resiliently engages the lip 90. The spring hook 87 locks around the lip 90 to position the orientation ring within the opening 35. The slightly smaller outer diameter of the lower surface portion 82B of the ring fits snugly within the lip 90 in the sidewall, while the larger outside diameter of upper surface portion 82A abuts the outside surface of the sidewall 30 around lip 90 (see e.g., FIG. 7).

The cylindrical inflator 25 is side-loaded into the container 21 after the orientation ring is coupled to the sidewall. More particularly, the inflator is initially inserted (threaded stud end 47 first) through the opening 35 in sidewall 30. As the inflator is inserted within the container, the threaded stud 72 is received in the opening 74 formed in the sidewall 31 (see e.g., FIG. 8). A fastener, e.g., a nut 94, and a washer 95 are then located around the projecting threaded stud 72 and drawn down on the stud to couple the end 47 of the inflator to the sidewall 31 of the container.

As the nut 94 is drawn down on the threaded stud 72, the inflator is drawn further into the container. More particularly, the tapered portion 63 of the flange on the inflator is drawn toward, and engages, the tapered shoulder 85 of the orientation ring 75 (see e.g., FIG. 7). The flange is drawn within the shoulder until the inner diameter of the shoulder becomes too small to permit further axial movement of the flange through the ring. The annular shape of the shoulder of the orientation ring centers the inflator within the ring such that the central axis "A" of the inflator housing is coincident (aligned) with the central axis "B" of the orientation ring.

Moreover, the inwardly-tapered shape of the shoulder permits a certain amount of tolerance between the inflator flange and the orientation ring. More particularly, the diameter of the flange on the inflator can vary slightly during manufacture and still be captured within the shoulder in the orientation ring. Further, as long as flange 62 is within the tolerance limits of the orientation ring, the diameter of the rest of the inflator housing can vary while still having full support within the orientation ring. In effect, having the orientation ring interposed between the inflator and the opening in the container relaxes the tolerance requirements necessary between the inflator and the container. The orientation ring also to some extent thermally and vibrationally isolates the inflator from the container and provides corrosion protection for these components.

To provide temporary support and attachment for the inflator while the nut 94 and washer 95 are being drawn down on the threaded stud 72, a temporary locking device, e.g., a second spring tab indicated at 96 (FIGS. 3, 4, 5 and 7), can be provided on the orientation ring. The spring tab 96 is preferably formed in one piece with and extends axially from the lower collar 84 of the retainer member. The spring tab 96 includes a resilient catch 97 which is designed to engage the flange 62 of the inflator 25 to couple the inflator at least temporarily to the container when the inflator is inserted within the can. The nut 94 and washer 95 can thereafter be drawn down on the threaded stud to couple the inflator more securely to the container.

When the inflator is initially located within the container, the inflator must be rotated such that the flat portion 65 on the flange 62 is aligned with a corresponding flat portion 100 extending as a chord connecting two points along the inner circumferential surface of the ring formed on the orientation ring 75. When the flat portions are aligned, the inflator can then be drawn axially into the container. The flat portions cooperate to orient the inflator, and hence the inflator gas nozzles 50, properly with respect to the container 21. More particularly, the relative positioning of the notch 89 in the sidewall lip 90 and the tab 86 on the orientation ring 75 initially align the ring 75 in a particular orientation with respect to the container. Thereafter, the relative positioning of the flat portion 65 on the inflator and the flat portion 100 on the orientation ring determine the final orientation of the inflator 25, and hence the fluid discharge port structure 50, within the container 21.

If adjustment of the inflator within the container is necessary, it is only necessary to replace the orientation ring 75 with a ring having a different configuration. For example, a ring can be provided with the flat portion 100 formed at a different location along the upper collar 83 of the ring to adjust the orientation of the inflator. It should also be apparent that the tab 86 could also be formed at a different location around the orientation ring to adjust the orientation of the inflator within the container. Further, the orientation ring could have other configurations, such as having a thicker frame 81 designed to support inflators having thinner diameters, or having other geometrically formed portions besides the flat portion 100 formed around the circumference of the inflator. In any case, the orientation of the inflator, and hence the gas nozzles, within the container can be quickly and efficiently adjusted by replacing a relatively inexpensive component (i.e., the orientation ring), rather than by modifying a relatively more expensive component (i.e., the inflator and/or the container).

Additionally, in order to provide protection for the squib wires 55 (and associated wire harness elements) at the end 46 of the inflator, a notch or recess 101 can be formed in the frame 77 of the orientation ring. The notch 101 enables the squib wires 55 to pass through the frame of the ring and be attached to a sensor or switch. The orientation ring thereby prevents the squib wires (and other elements) from being trapped against the frame of the orientation ring and possibly being damaged if the inflator or air bag module is dropped or struck along the end 46 during installation.

Accordingly, the present invention provides a simple, efficient and inexpensive orientation device for installing an inflator within the container of an air bag module. The orientation device supports the inflator in a predetermined orientation within the container and can be easily modified and/or replaced to adjust the inflator orientation, and hence the orientation of the gas nozzles, within the container.

According to an additional aspect of the invention, the length of the inflator 25 is preferably selected to be slightly less than the length of the container 21. Consequently, as the nut 94 is drawn down on the threaded stud 72, the sidewall 31 of the container is forced to bow or bend inwardly because the flange 62 of the inflator is engaged with and retained by the orientation ring 75. When the nut is fully tightened, the bent sidewall 31 exerts an axially outward directed force against the nut 94 on the threaded stud 72 to lock the nut securely on the stud. This flexing of the sidewall 31 not only provides a preload on the nut 94 (which resists accidental loosening of the nut from the threaded stud), but also allows inflators having slightly different lengths to be used in the container without having structurally to modify the container, the inflator housing, or both.

Figure 9:
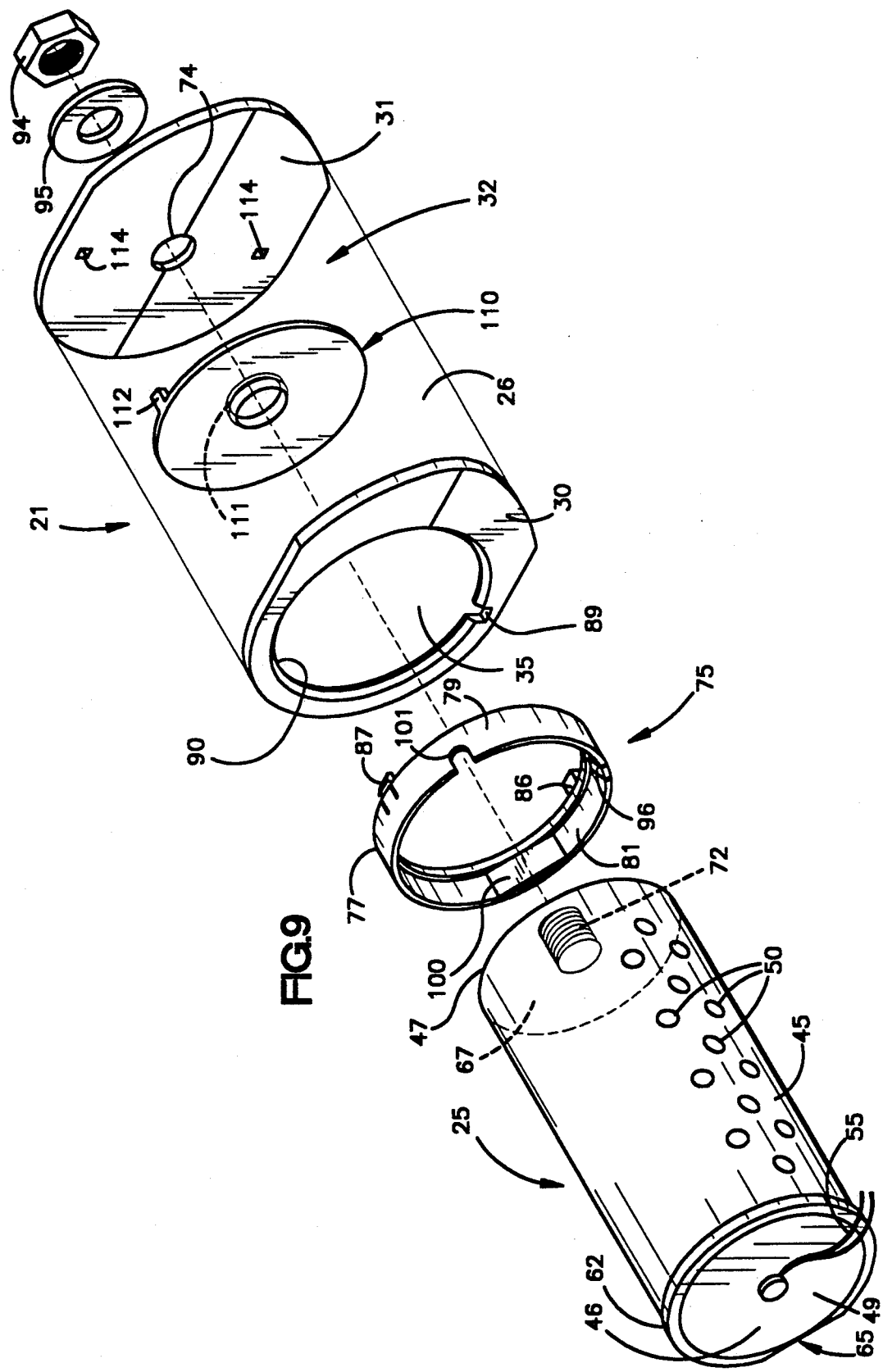
FIG. 9 is a schematic exploded illustration of certain components of the air bag module similar to that shown in FIG. 2, but illustrating an isolator member designed to be interposed between the inflator and the sidewall of the reaction can.
Figure 10:
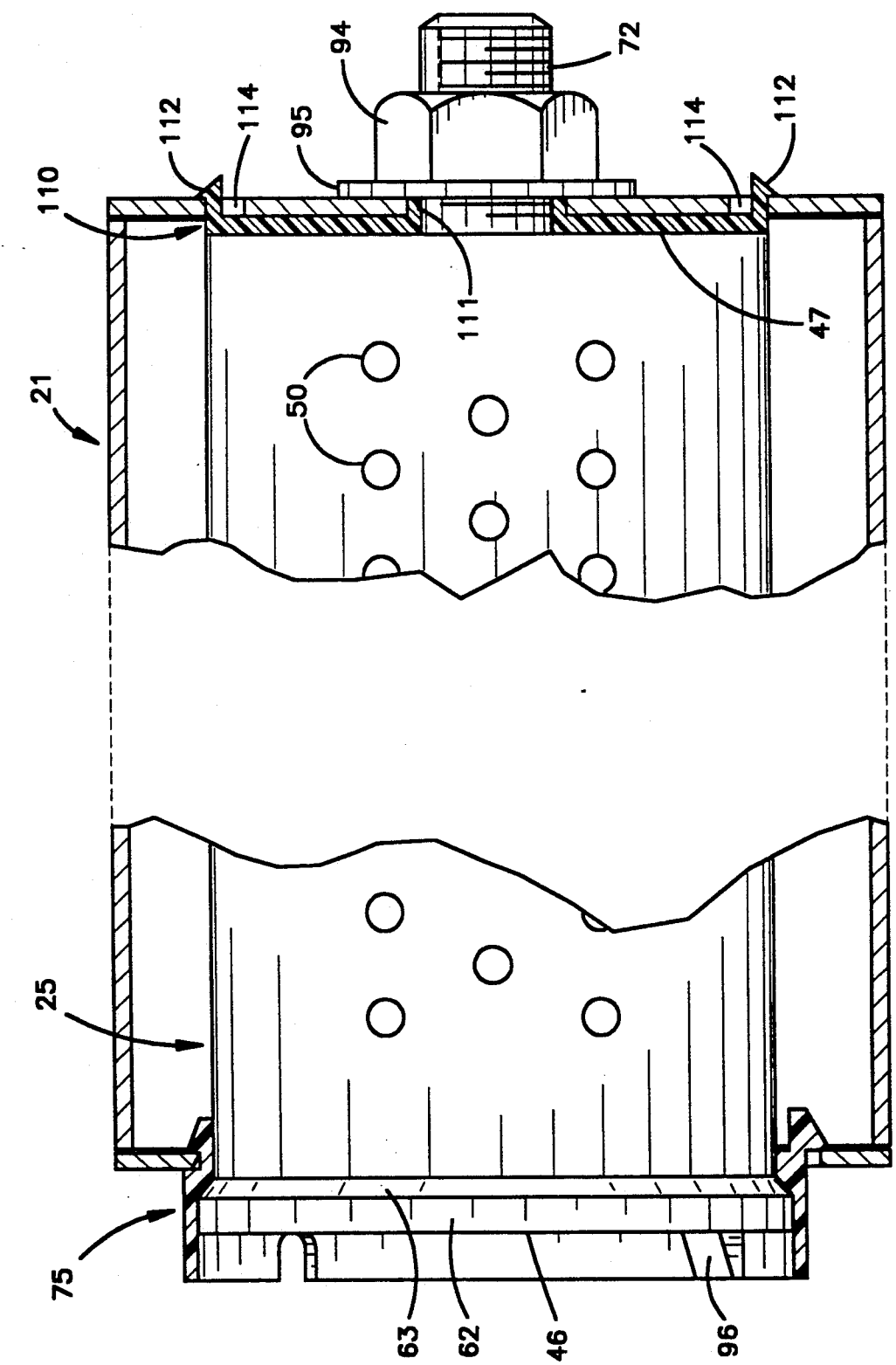
FIG. 10 is an enlarged, partial schematic cross-sectional side view of the fully assembled reaction can similar to that shown in FIG. 8, but illustrating the isolator member interposed between the inflator and the sidewall of the reaction can.

According to still another aspect of the invention, as illustrated in FIGS. 9 and 10, an isolator member, indicated generally at 110, can be interposed between the end wall 67 of the inflator 25 and the inner surface of the sidewall 31. The isolator member 110 preferably comprises a relatively rigid polymeric washer with an integral sleeve 111 which is placed around the threaded stud 72 of the inflator before the threaded stud is located in hole 74 in sidewall 31. The isolator member 110 can include a pair of locking tabs 112 which are received in apertures 114 formed in sidewall 31. The sleeve 111, tabs 112 and apertures 114 allow preassembly of the isolator member with the container and help prevent the isolator member 110 from rotating within the can. When the nut 94 is drawn down on the threaded stud 72, the isolator member 110 is compressed between the sidewall 31 of the container and the end wall 67 of the inflator. The isolator member 110 thus generally thermally and vibrationally isolates the end of the inflator from the container, and provides some corrosion protection for these components. For additional isolation, washer 95 could be made of similar polyermic material. The other end cap 46 of the inflator is isolated from the container by virtue of being supported by the orientation ring 75.

Accordingly, the present invention provides a vehicle air bag assembly with an orientation device for orienting and supporting an air bag inflator in a predetermined orientation within an air bag container such as a reaction can, reaction plate or other reaction device. The structure and method are simple, efficient, inexpensive and are easily adapted to provide a vehicle air bag container which can be used with a wide number of commercially-available inflators. However, with the present disclosure in mind, it is believed that obvious alternatives to the preferred embodiment will become apparent to those of ordinary skill in the art.

What is claimed is:

1. An apparatus for use in forming a vehicle air bag assembly, said apparatus comprising:
    a housing having a wall structure forming an internal cavity for an inflator, said wall structure including a pair of spaced-apart sidewalls, one of said pair of sidewalls defining an opening having a configuration which enables an inflator to be inserted through said opening and the other of said pair of sidewalls forming part of a coupling structure for coupling one end of the inflator to said housing when the inflator is disposed within said housing cavity; and
    an orientation device coupled to said one of said pair of sidewalls, said orientation device having a configuration which supports a predetermined portion of the inflator in said opening and maintains the inflator in a predetermined rotational orientation within said housing cavity;
    wherein said orientation device includes an orientation ring surrounding a central axis, said orientation ring including a resiliently deflectable inflator coupling tab extending axially away from said ring, said inflator coupling tab engaging the one end of the inflator when the inflator is inserted into the housing to couple the inflator at least temporarily to the housing.

2. An air bag assembly comprising:

a reaction device having a housing at least partially enclosing an inflator and an air bag, said inflator at one end being coupled to one portion of said housing and at the other end being received within an opening formed in another portion of the housing; and an orientation device coupled to said housing to support the other end of said inflator in the opening and maintain the inflator in a predetermined rotational orientation within said reaction device;

wherein said orientation device includes an orientation ring surrounding a central axis, said orientation ring including a resiliently deflectable inflator coupling tab extending axially away from said ring, said inflator coupling tab engaging one end of the inflator to couple the inflator at least temporarily to the housing.

3. Apparatus comprising an orientation device for use in supporting an air bag inflator in a housing, said orientation device comprising:

a frame designed to be interposed between the housing and the inflator, said frame having an outer portion designed to engage a portion of the housing and an inner portion designed to engage an inflator being inserted into the housing, said inner portion of said frame having a configuration which requires the inflator to be inserted into the housing in a predetermined rotational orientation and which supports a predetermined portion of the inflator in the housing when the inflator is in the predetermined rotational orientation in the housing;

wherein said frame includes an orientation ring surrounding a central axis, said orientation ring including a resiliently deflectable inflator coupling tab extending axially away from said ring, said inflator coupling tab engaging the one end of the inflator to couple the inflator at least temporarily to the housing.

4. An apparatus for use in forming a vehicle air bag assembly, said apparatus comprising:

a housing having a wall structure forming an internal cavity for an inflator, said wall structure including a pair of spaced-apart sidewalls, one of said pair of sidewalls defining an opening having a configuration which enables an inflator to be inserted through said opening and the other of said pair of sidewalls forming part of a coupling structure for coupling one end of the inflator to said housing when the inflator is disposed within said housing cavity; and an orientation member coupled to said one of said pair of sidewalls, said orientation member being interposed between a predetermined portion of the inflator and the portion of the sidewall forming the opening and having a configuration to support the predetermined portion of the inflator in said opening and maintain the inflator in a predetermined orientation within said housing cavity;

wherein said orientation member has a configuration which engages a predetermined first portion of the inflator to rotationally orient the inflator within the reaction device and engages a predetermined second portion of the inflator to align said central axis of the inflator with said central axis of said orientation device when the one end of the inflator is coupled to said housing;

wherein said orientation member includes an orientation ring formed in one piece and surrounding said central axis, said orientation ring having an inner circumferential surface which defines an entrance opening and which includes a chord-shaped segment extending from one portion of said entrance opening to another portion of said entrance opening, said chord-shaped segment on said ring being adapted to engage a correspondingly-shaped surface formed on the other end of the inflator to require the inflater to be aligned in the predetermined orientation when the inflator is inserted into the housing, said orientation ring also having an inwardly-tapered shoulder extending toward said central axis, said shoulder having a configuration which engages the predetermined portion of the inflator and aligns a central axis of the inflator with said central axis of the orientation ring when the one end of the inflator is coupled to the housing.

5. An air bag assembly, comprising:

a reaction device having a housing at least partially enclosing an inflator and an air bag, said inflator at one end being coupled to one portion of said housing and at the other end being received within an opening formed in another portion of the housing; and an orientation member coupled to said housing and interposed between said other end of the inflator and the portion of the housing forming the opening to support the other end of said inflator in the opening and maintain the inflator in a predetermined orientation within said reaction device;

wherein said orientation member has a configuration which engages a predetermined first portion of the inflator to rotationally orient the inflator within the reaction device and engages a predetermined second portion of the inflator to align a central axis of the inflator with a central axis of said orientation device when the one end of the inflator is coupled to said housing;

wherein said orientation member includes an orientation ring formed in one piece and surrounding a central axis, said orientation ring having an inner circumferential surface which defines an entrance opening and which includes a chord-shaped segment extending from one portion of said entrance opening to another portion of said entrance opening, said chord-shaped segment on said ring being adapted to engage a correspondingly-shaped surface formed on the other end of the inflator to require the inflator to be aligned in the predetermined orientation when the inflator is inserted into the housing, said orientation ring also having an inwardly-tapered shoulder extending toward said central axis, said shoulder having a configuration which engages the predetermined portion of the inflator and aligns said central axis of the inflator with said central axis of the orientation ring when the one end of the inflator is coupled to the housing.

6. An apparatus for use in forming a vehicle air bag assembly, said apparatus comprising:

a housing having a wall structure forming an internal cavity for an inflator, said wall structure including a pair of spaced-apart sidewalls, one of said pair of sidewalls defining an opening having a configuration which enables an inflator to be inserted through said opening and the other of said pair of sidewalls forming part of a coupling structure for coupling one end of the inflator to said housing when the inflator is disposed within said housing cavity; and an orientation device coupled to said one of said pair of sidewalls, said orientation device having a configuration which supports a predetermined portion of the inflator in said opening and maintains the inflator in a predetermined rotational orientation within said housing cavity;

wherein said orientation device includes an orientation ring formed in one piece and surrounding a central axis, said orientation ring having an inner circumferential surface which defines an entrance opening and which includes a chord-shaped segment extending from one portion of said entrance opening to another portion of said entrance opening, said chord-shaped segment on said ring being adapted to engage a correspondingly-shaped surface formed on the other end of the inflator to require the inflator to be aligned in the predetermined orientation when the inflator is inserted into the housing, said orientation ring also having an inwardly-tapered shoulder extending toward said central axis, said shoulder having a configuration which engages the predetermined portion of the inflator and aligns said central axis of the inflator with said central axis of the orientation ring when the one end of the inflator is coupled to the housing.

7. An air bag assembly, comprising:

a reaction device having a housing at least partially enclosing an inflator and an air bag, said inflator at one end being coupled to one portion of said housing and at the other end being received within an opening formed in another portion of the housing; and an orientation device coupled to said housing to support the other end of said inflator in the opening and maintain the inflator in a predetermined rotational orientation within said reaction device;

wherein said orientation device includes an orientation ring formed in one piece and surrounding a central axis, said orientation ring having an inner circumferential surface which defines an entrance opening and which includes a chord-shaped segment extending from one portion of said entrance opening to another portion of said entrance opening, said chord-shaped segment on said ring being adapted to engage a correspondingly-shaped surface formed on the other end of the inflator to require the inflator to be aligned in the predetermined orientation when the inflator is inserted into the housing, said orientation ring also having an inwardly-tapered shoulder extending toward said central axis, said shoulder having a configuration which engages the predetermined portion of the inflator and aligns said central axis of the inflator with said central axis of the orientation ring when the one end of the inflator is coupled to the housing.

8. An apparatus comprising an orientation device for use in supporting an air bag inflator in a housing, said orientation device comprising:

a frame designed to be interposed between the housing and the inflator, said frame having an outer portion designed to engage a portion of the housing and an inner portion designed to engage an inflator being inserted into the housing, said inner portion of said frame having a configuration which requires the inflator to be inserted into the housing in a predetermined rotational orientation and which supports a predetermined portion of the inflator in the housing when the inflator is in the predetermined rotational orientation in the housing;

wherein said frame includes an orientation ring formed in one piece and surrounding a central axis, said orientation ring having an inner circumferential surface which defines an entrance opening and which includes a chord-shaped segment extending from one portion of said entrance opening to another portion of said entrance opening, said chord-shaped segment on said ring being adapted to engage a correspondingly-shaped surface formed on the other end of the inflator to require the inflator to be aligned in the predetermined orientation when the inflator is inserted into the housing, said orientation ring also having an inwardly-tapered shoulder extending toward said central axis, said shoulder having a configuration which engages the predetermined portion of the inflator and aligns said central axis of the inflator with said central axis of the orientation ring when the inflator is inserted into the housing.

* * * * *